UNITED STATES PATENT OFFICE.

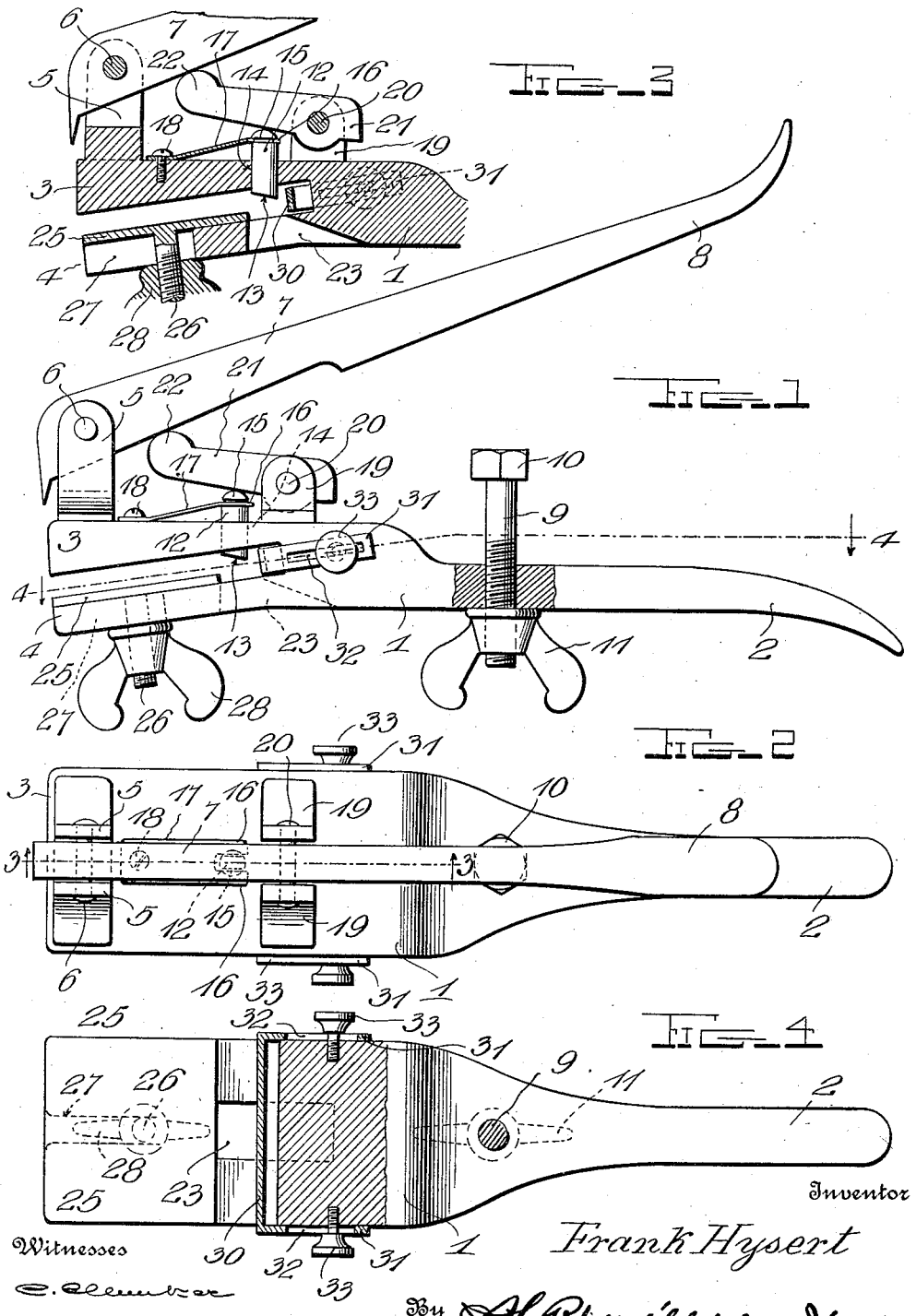

FRANK HYSERT, OF SALAMANCA, NEW YORK, ASSIGNOR OF ONE-HALF TO HOWARD WRIGHT, OF SALAMANCA, NEW YORK.

SAW-SET.

1,060,569.  Specification of Letters Patent.  Patented Apr. 29, 1913.

Application filed June 3, 1912. Serial No. 701,360.

*To all whom it may concern:*

Be it known that I, FRANK HYSERT, a citizen of the United States, residing at Salamanca, in the county of Cattaraugus and State of New York, have invented certain new and useful Improvements in Saw-Sets; and I do declare the following to be a full, clear, and exact description of the invention, such as will enable others skilled in the art to which it appertains to make and use the same.

This invention relates to metal tools and implements, and more especially to saw setting devices employing a sliding set which is operated by a lever; and the object of the same is to produce improvements in the lever mechanism by which the set is projected and in the various gages and their adjustments whereby all the teeth of a saw may be set alike. These and other objects are accomplished by constructing the tool in the manner hereinafter more fully described and claimed, and as shown in the drawings wherein—

Figure 1 is a side elevation partly in section, Fig. 2 a plan view, Fig. 3 a fragmentary vertical section through the front end of the device, and Fig. 4 is a horizontal section on the line 4—4 of Fig. 1.

The main member or fixed jaw 1 of this tool has a handle 2 at one extremity and is forked or bifurcated at its other extremity so as to produce upper and lower lips 3 and 4 with a slot between them across the member and through which the saw blade is passed in the usual manner. Rising from the outer end of the upper lip 3 is a lug 5 in which at 6 is pivoted the other member or movable arm 7 whose handle portion 8 overlies the handle 2 of the fixed jaw. Through the latter is passed a screw 9 whose head 10 at its upper end forms a stop for limiting the descent of the movable arm 7, and a thumb nut 11 on the lower end of this screw holds it after it has been adjusted through the handle 2. Thereby is produced a gage for limiting the closing of the two jaws or members toward each other.

The set 12 is a steel pin with its lower end beveled as at 13, its body sliding vertically in a hole 14 through the upper lip 3, and its upper end grooved as at 15 for the reception of a fork 16 at the free end of the spring 17 attached as at 18 upon said lip 3 and whose tendency is normally to raise the set as shown in Fig. 1. Secured to and rising from the upper lip 3 is a lug 19 in which at 20 is pivoted a lever 21 having a rounded nose 22 at its forward end which rests against the under side of the movable arm 7, and the head of the set rests beneath this lever near its pivot 20. It follows that when the handle portion 8 of the arm 7 is depressed, its body depresses the nose 22 so as to cause the lever 21 to turn on its pivot 20, and the body of the lever bearing on the head of the set causes the latter to slide downward through the hole 14 in the upper lip 3 so that its beveled lower end 13 is moved across the space between the two lips 3 and 4. Directly beneath the hole 14 the lower lip 4 has a rather large opening 23 into which the saw teeth are deflected by the depression of the set, and through which the operator can see the extent of said deflection.

The numeral 25 designates a plate overlying the upper face of the lower lip 4 and having a threaded shank 26 extending downward through a longitudinal slot 27 formed in said lower lip and receiving a thumb nut 28 on its lower end; and by this means the plate may be adjusted forward or backward over the lower lip and nearer to or farther from the opening 23. This detail forms a gage by means of which the length of each saw tooth, in a direction at right angles to the length of the toothed edge of the saw blade, may be regulated so that all the saw teeth in a saw will be set alike in this respect.

The numeral 30 designates a U-shaped gage whose body extends transversely across the slot between the upper and lower lips 3 and 4 and whose arms 31 are slotted longitudinally as at 32 to receive set screws 33 which pass into threaded openings in the sides of the main member 1. This detail provides a gage by which the depth the saw blade may be inserted in the tool can be set, because by loosening the two set screws and adjusting the gage 30 and then tightening said screws this member can be set nearer to or farther from the seat 12 and held there.

All parts of this device are by preference of metal, the set 12 should be of finely tempered steel, and possibly the bifurcated end of the main member should also be tempered, although these details as well as the specific construction of all parts may be left to the manufacturer.

In operation, the various gages having been set as desired, the saw blade is inserted in the slot between the upper and lower lips and pushed to the rear so that the teeth are projected past the plate 25 and against the body of the gage 30, and then when the two handles 8 and 2 are drawn together until the upper arm 7 contacts with the head 10 of the screw 9, the nose 22 of the lever 21 is depressed and said lever turned on its pivot 20 so that the set 12 is pushed downward through the hole 14 and its beveled lower end 13 sets the saw tooth downward into the opening 23 in a manner which will be clear. On release of the pressure on the handle 8, the spring 17 raises the lever and the latter raises the arm 7 so that the parts resume the position shown in Fig. 1; and the tool is then moved along the edge of the saw until the next tooth comes over the opening, when the action is repeated.

What is claimed as new is:—

1. In a saw set, the combination with the main member having a bifurcated front end with a hole through the upper lip thereof and an opening through the lower lip beneath said hole, and two lugs rising from said upper lip; of an arm pivoted at one end to the forward lug, a lever pivoted at one end to the rearward lug and having a nose at its other end resting beneath said arm, a set whose body slides in said hole, whose lower end is beveled and adapted to pass through said opening, and whose upper end is grooved in its opposite sides, and a spring secured at one end upon the upper lip and having its other end forked and engaging said groove, for the purpose set forth.

2. In a saw set, the combination with the main member having a bifurcated front end with a hole through the upper lip thereof and an opening through the lower lip beneath said hole; of a handle member pivoted at its front end to the main member, a lever pivoted at one end to the main member and having a nose at its other end resting beneath said handle member, a set whose body slides in said hole beneath said lever, and a spring secured at one end upon the upper lip and having its other end engaging said set, for the purpose set forth.

3. In a saw set, the combination with the main member having a bifurcated front end with a hole through the upper lip thereof and an opening through the lower lip beneath said hole; of a handle member pivoted at its front end to the main member, a lever pivoted at one end to the main member and having a nose at its other end resting beneath said handle member, a set whose body slides in said hole, whose lower end is beveled and adapted to pass through said opening, and whose upper end is grooved in its opposite sides, and a spring secured at one end upon the upper lip and having its other end forked and engaging said groove, for the purpose set forth.

4. In a saw set, the combination with the main member having a bifurcated front end with a hole through the upper lip thereof and an opening through the lower lip beneath said hole, and two lugs rising from said upper lip; of an arm pivoted at one end to the forward lug, a lever pivoted at one end to the rearward lug and having a nose at its other end resting beneath said arm, a set whose body slides in said hole beneath said lever, and a spring secured at one end upon the upper lip and having its other end engaging said set, for the purpose set forth.

In testimony whereof I have hereunto set my hand in presence of two subscribing witnesses.

FRANK HYSERT.

Witnesses:
HOWARD WRIGHT,
JAMES P. QUIGLEY.